Oct. 17, 1939.    H. NUTT    2,176,224
AUTOMATIC CLUTCH
Filed Sept. 14, 1932    3 Sheets-Sheet 1
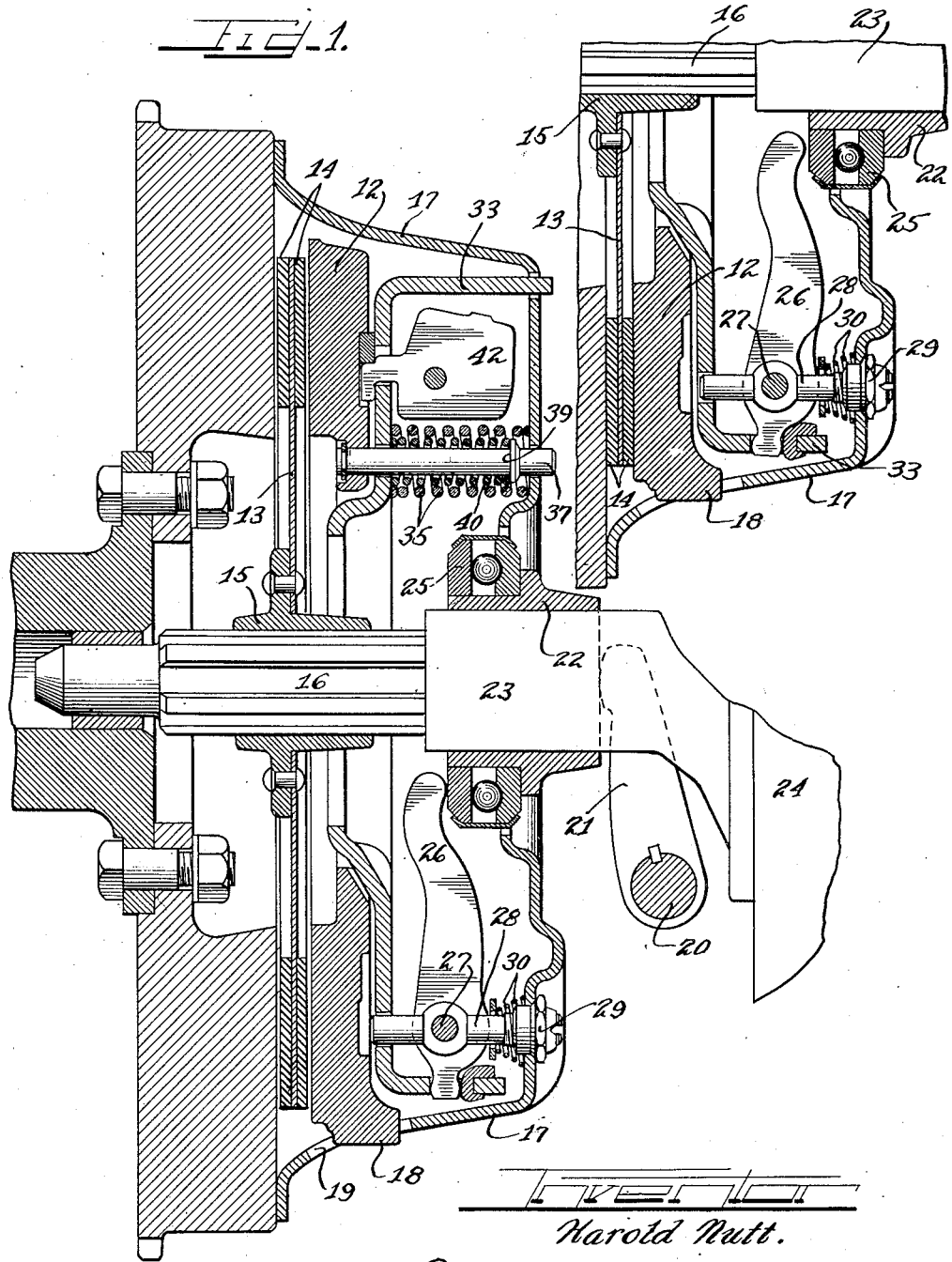
Inventor
Harold Nutt.
by Charles H. Hill    Attys Oct. 17, 1939.   H. NUTT   2,176,224
AUTOMATIC CLUTCH
Filed Sept. 14, 1932   3 Sheets-Sheet 2
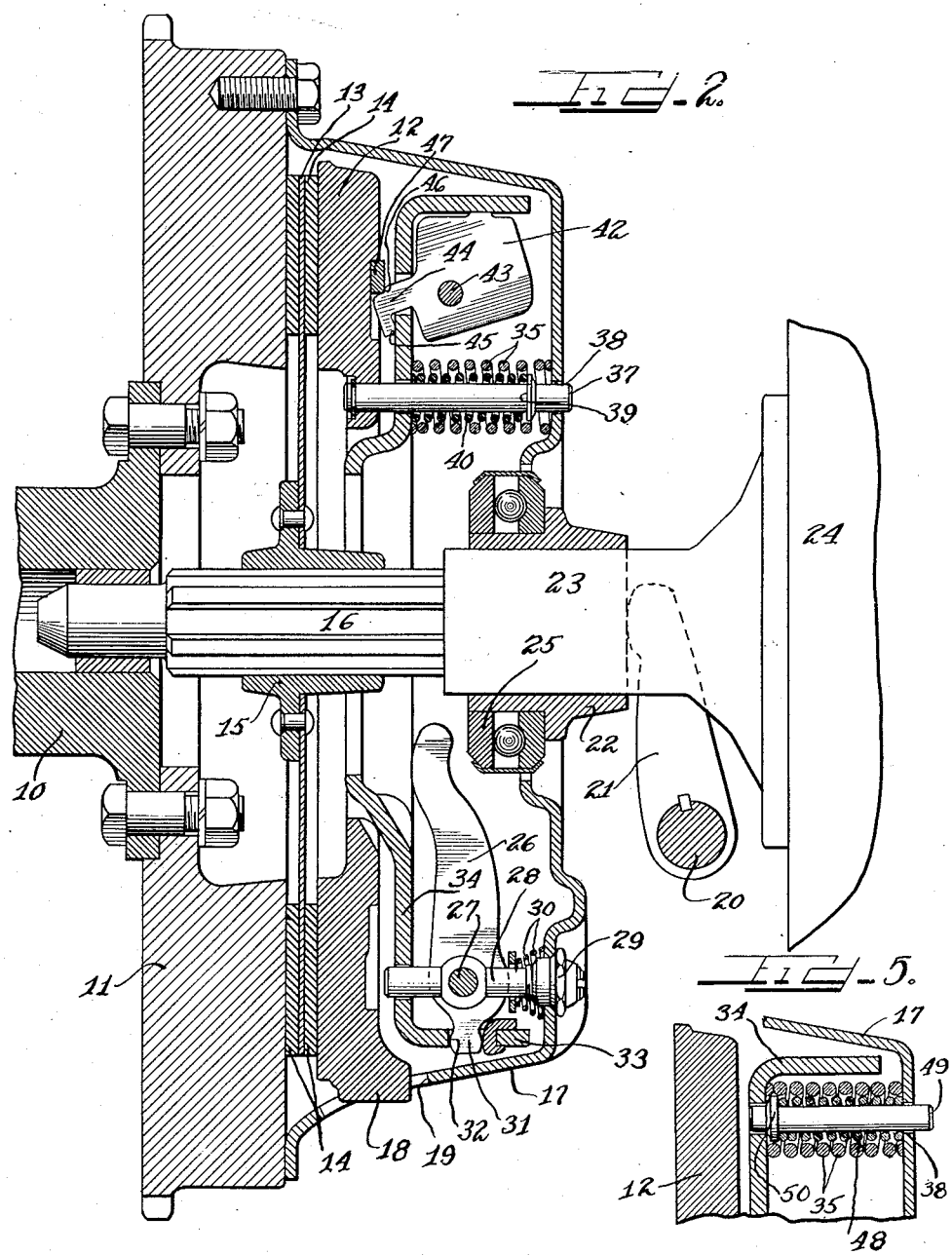
Inventor
Harold Nutt.
by Charles H. Will
Attys.

Oct. 17, 1939. H. NUTT 2,176,224
AUTOMATIC CLUTCH
Filed Sept. 14, 1932 3 Sheets-Sheet 3

Inventor
Harold Nutt.
by Charles T. Wills
Attys.

Patented Oct. 17, 1939

2,176,224

UNITED STATES PATENT OFFICE 2,176,224

AUTOMATIC CLUTCH

Harold Nutt, Chicago, Ill., assignor, by mesne assignments, to Borg-Warner Corporation, Chicago, Ill., a corporation of Illinois Application September 14, 1932, Serial No. 633,042

9 Claims. (Cl. 192—105)

This invention relates to automatically operating clutches of the centrifugally energized type wherein the clutch is normally automatically engaged and disengaged as the speed of the driving member is increased or decreased through a predetermined rotative speed range. While the chosen embodiment of this invention has been designed to meet the specific operating requirements of automotive clutches, it will be understood that the clutch of my invention can be used for various other purposes.

It is an object of this invention to provide an improved clutch of the class described that will normally engage and disengage automatically under the influence of centrifugal force at a predetermined rotative speed, and will yet be entirely under the operator's control for both engagement and release, the manual control being so arranged as to act through a normal clutch throwout mechanism, the manual control not being required to overcome this automatic control.

It is another object of this invention to provide an improved clutch mechanism of the class described which is entirely under the operator's control at all times, disengagement being accomplished through the medium of conventional clutch throwout bearings and fingers adapted to retract the pressure plate from engagement with the driven member, an automatic clutch engaging mechanism being provided which is adapted to operate at a predetermined speed to advance the pressure plate relative to the throwout fingers and thus cause automatic clutch engagement unless the operator compensates therefor by a further shift of the throwout mechanism.

It is a further object of this invention to provide an improved and simplified automatic clutch operating mechanism wherein centrifugal weights cause the clutch to engage at a predetermined rotative speed with a maximum predetermined yielding engaging pressure unaffected by increasing centrifugal forces above the rotative speed at which the clutch becomes fully engaged.

It is also an object of this invention to provide an improved and simplified automatically operated clutch dominated by a manual control capable of causing engagement or disengagement thereof regardless of the action of the automatic control, the manual control being normally out of contact with the clutch operating parts when the clutch is fully engaged by the automatic control.

It is still another object of this invention to provide an improved and simplified automatic clutch that can be economically manufactured and interchanged with manually operated clutches, and easily serviced to compensate for normal wear in use.

Other and further important objects of this invention will be apparent from the disclosures in the specification and the accompanying drawings.

This invention (in a preferred form) is illustrated in the drawings and hereinafter more fully described.

On the drawings:

Figure 1 is a central vertical section through an automotive type of clutch embodying the features of this invention, the clutch being shown in its automatically disengaged position. The section shown corresponds to the line I—I in Figure 4.

Figure 2 is a section on the line I—I in Figure 4 showing the clutch in the fully engaged position.

Figure 3 is a fragmentary section corresponding to the lower part of Figure 1 but showing the clutch manually engaged, the difference in the figures resulting from a movement to the right of the throwout bearing.

Figure 5 is a fragmentary section on the line V—V of Figure 4.

Figure 4:
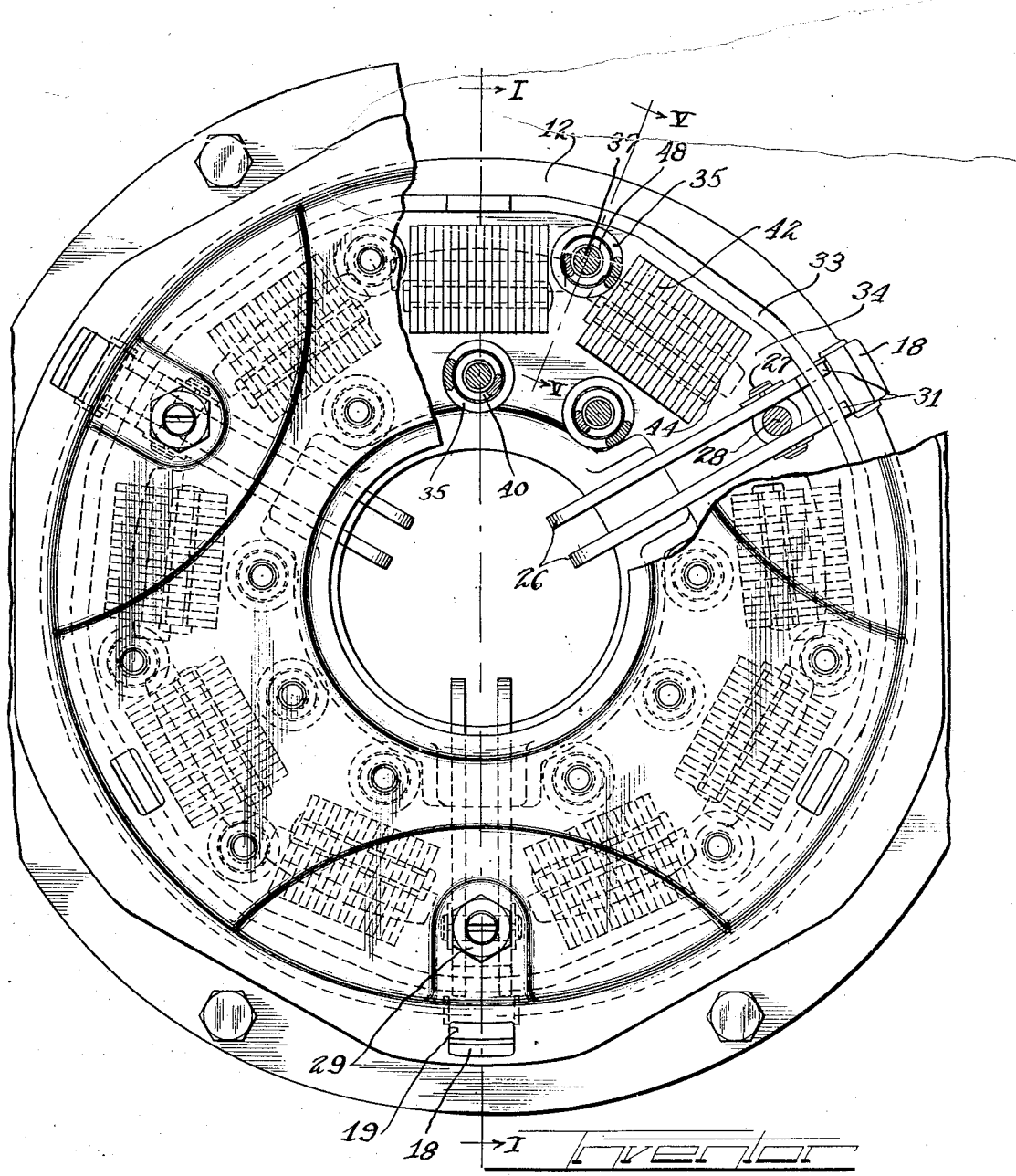
Figure 4 is an elevational or rear view of the clutch housing, partly broken away and with the driven shaft omitted.

As shown:

The automotive type of clutch chosen as the illustrated embodiment of this invention is of the single plate type, although it is to be understood that my invention is not limited in application to the particular service mentioned. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc 13 carries the usual friction facing material 14 on both sides and is mounted on a hub 15 splined to and slidable along a transmission drive shaft 16, which shaft is the driven shaft of the clutch and will be hereinafter so referred to for convenience. The pressure plate 12 and the operating mechanism therefor is enclosed in a casing or housing 17 bolted to the rear face of the flywheel and revolving therewith, the pressure plate having outstanding lugs 18 which enter slots 19 in the housing wall to cause the pressure plate to revolve with the flywheel and housing.

The foregoing described structure corresponds to a usual form of manually operated clutch wherein the pressure plate is urged into engagement by spring pressure and is retracted, to disengage the clutch, by the usual clutch throwout lever acting on a shaft 20 which carries a fork 21 acting to shift a sliding collar 22 to the left on a sleeve 23 enveloping the clutch shaft 16 and secured to the transmission case 24. The collar 22 carries a thrust bearing 25 which contacts the inner ends of throwout fingers 26 which in the usual manual clutch would be so linked directly to the pressure plate as to retract the same. In the present case the fingers do not act directly on the pressure plate, as will be described in more detail hereinafter, although their functions include the manual retraction or advance of the pressure plate at the will of the operator.

The fingers 26 are pivoted at 27 to studs 28 supported by adjustable nuts 29 seating in the housing 17. Springs 30 are positioned about the studs between the fingers 27 and the housing and serve to maintain the studs in position. Adjustment of the nuts 29 provides proper setting of the throwout fingers during manufacture to secure parallelism between the clutch elements. Thus the clutch of this invention resembles a manual clutch in many respects, and may be disengaged in the same way.

The outer ends 31 of the throwout fingers 26 are formed to engage in apertures 32 in the flange 33 of a spring mounting ring 34 which is provided within the housing, clutch pressure springs 35 and 48 being compressed between the housing and the spring ring instead of bearing directly on the pressure plate 12 as in a normal manually operated clutch. Under some conditions of operation, the pressure plate and spring ring are held together so that the pressure plate then moves with the spring ring as will be described in more detail hereinafter. The action of the pressure springs 35 and 48 tends to shift the spring ring to the left and the ring in turn pulls the throwout fingers 26 clockwise, causing the inner ends of the fingers to bear against the throwout bearing. Thus if the bearing 25 is shifted to the right as in Figure 3, the fingers are allowed to move further in the same direction and the spring ring then moves to the left to cause clutch engagement. If the throwout bearing is moved to the left it forces the spring ring to the right causing a retraction of the pressure plate even if the automatic mechanism has fully engaged the clutch. It will thus be noted that the fork 21 for operating the throwout bearing has a normal position for normal automatic control, a movement to the left for manual disengagement, and a movement to the right for manual engagement.

There are a total of fifteen pressure springs 35 as shown in Figure 4, six of which are symmetrically disposed in pairs in an outer circle between the throwout finger studs. These springs in the outer circle form outer springs disposed about studs 49 which pilot in the spring ring at their inner ends, the outer ends being guided in apertures 38 in the housing. The studs are shouldered at 50 to form spring seats for relatively light pressure springs 48 positioned within the pressure springs 35. Nine more of the pressure springs 35, on the inner spring circle, contain studs 37 shouldered at 39 for retractor springs 40 serving to resiliently hold the pressure plate against the spring ring. The number and strength of these retractor springs govern the speed of rotation required for automatic engagement. The number and strength of the pressure springs 35 and 48 determine the maximum capacity of the clutch.

The inner spring 48 comprises a helper spring. The method of mounting the springs 35 and 38, as shown, is not essential but is an advantageous way of overcoming the distortion effects of the centrifugal force on the pressure springs.

The automatic clutch operating mechanism is arranged to separate the pressure plate from the spring ring, which latter remains in a position determined by the throwout bearing except when the clutch is fully engaged by either the manual or automatic mechanism. When automatically engaged, the spring ring is shifted slightly to the right to lift the throwout fingers away from the throwout bearing, as shown in Figure 2, in order to prevent scuffing or dragging thereof and to relieve the bearing 25 from the load when the clutch is engaged.

Automatic clutch engagement is accomplished by weights 42 so formed and mounted as to respond to centrifugal force and swing outwardly into contact with the flange 33 of the spring ring 34, which flange is flattened adjacent each of the weights in order to provide a full line contact for weights assembled in a straight line. The weights may conveniently be formed by assemblies of sheet metal stampings which may be riveted together at 43 if so desired. The weights are formed with lugs 44 which extend through suitable apertures in the spring ring, the lugs having inwardly extending projections 45 which hook under the spring ring and are located between the spring ring and the pressure plate in an annular recess in the pressure plate. The opposite edge of the lugs are formed with shoulders 46 which bear on hardened inserts 47 on the pressure plate. The lugs 44 resemble a boot and it will be convenient to call the projections 45 the toe thereof whereas the shoulders 46 correspond to a heel. The weights are guided by the slots in the spring ring and are limited in travel by the flange of the spring ring. When the weights swing outwardly about the heels 46 as pivots the toes 45 of the lugs tend to lift the spring ring away from the pressure plate, but since the spring ring is backed by heavy spring pressure the result is that the heels 46 shift the pressure plate to the left away from the spring ring against the action of the retractor springs, bringing the pressure plate into contact with the driven disc. The clutch parts are so adjusted that full engagement occurs before the weights quite reach the spring ring flange so that the final movement of the weights, after the pressure plate is prevented from further advance, serves to slightly shift the spring ring to the right to entirely transfer the pressure spring load to the pressure plate. At the same time this slight movement of the spring ring to the right serves to withdraw the throwout fingers from the bearing.

The operation of the clutch has been described hereinbefore in connection with the description of the various elements but it may be convenient to summarize the subject at this point. With the clutch parts in the position of Figure 1, which represents a normally disengaged clutch corresponding to either a dead or idling engine, the clutch may be manually engaged by moving the throwout bearing to the right into the position of Figure 3, the pressure spring load acting on the spring ring and forcing the same to the left as the throwout bearing is retracted to permit clockwise movement of the throwout fingers. The clutch may also be automatically engaged by speeding up the engine until sufficient centrifugal force is generated by the weights to overcome the force of the retractor springs, the weights then swinging out into the position of Figure 2 to advance the pressure plate relative to the spring ring. The clutch is so adjusted that the final movement of the weights serves to slightly shift the spring ring to the right to transfer the pressure spring load to the pressure plate, as well as to remove the load from the throwout bearing.

Any suitable releasable means may be employed for holding the manual operating device such as a foot pedal, in an intermediate position so as to establish an intermediate position for the port 21. Since such holding devices are well known, none is illustrated in the disclosure herein.

When the clutch is thus automatically engaged a movement of the throwout bearing to the left in Figure 2 will move the throwout fingers in a counterclockwise direction to retract both the pressure plate and spring ring to release the clutch. Under these circumstances, the spaced relationship of the pressure plate and spring ring is not affected so that the manual throwout does not have to overcome the centrifugal forces acting on the weights, but merely to compress the pressure springs as in a normal manually controlled clutch.

It will thus be seen that I have invented an improved and simplified automatic clutch wherein the automatic control is at all times subordinate to a manual control for either engaging or disengaging the clutch and that the manual control does not have to overcome the automatic control.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An automatic clutch comprising a driving member, a driven member, a rigid pressure plate revolving with the driving member on the opposite side of the driven member and axially movable to engage the driven member against the driving member, a housing for the pressure plate, a spring ring interposed between the pressure plate and the housing, pressure springs pre-compressed between the spring ring and the housing, manually operable means for advancing or retracting said spring ring and centrifugally responsive means engaged between the spring ring and the pressure plate and including weight members disposed within the housing rearwardly of the spring ring to shift the pressure plate away from the spring ring into engagement with the driven member at a predetermined rotative speed when the manually operable means is in an intermediate position.

2. An automatic clutch comprising a driving member, a driven member, a rigid pressure plate revolving with the driving member on the opposite side of the driven member and axially movable to engage the driven member against the driving member, a housing for the pressure plate, a spring ring interposed between the pressure plate and the housing, spring means acting to retract said pressure plate against said spring ring, pressure springs pre-compressed between the spring ring and the housing, manually operable means for advancing or retracting said spring ring, and centrifugally responsive means engaged between the spring ring and the pressure plate and including weight members disposed within the housing rearwardly of the spring ring to shift the pressure plate away from the spring ring into engagement with the driven member at a predetermined rotative speed, when the manually operable means is in an intermediate position.

3. An automatic clutch comprising a driven member, a driving member including a housing enveloping the driven member and containing a pressure plate movable into engagement with said driven member, spring mounting means interposed between the housing and the pressure plate, pre-loaded pressure springs mounted between the spring mounted means and the housing and adapted to act through the spring mounting means to urge the pressure plate into clutching engagement with the driven member, manually movable means operable to control the position of said spring mounting means, and centrifugally responsive means having the form of weighted floating levers fulcrumed on the pressure plate and spring mounting means respectively and adapted to separate the pressure plate and the spring mounting means whereby to cause clutching engagement between the pressure plate and the driven member when the manually operable means is in a predetermined intermediate position.

4. An automatic clutch comprising a driven member, a driving member including a housing enveloping the driven member and containing a pressure plate movable into engagement with said driven member, spring mounting means interposed between the housing and the pressure plate, retracting means adapted yieldably to hold the pressure plate against the spring mounting means, pre-loaded pressure springs mounted between the spring mounted means and the housing and adapted to act through the spring mounting means to urge the pressure plate into clutching engagement with the driven member, manually movable means operable to control the position of said spring mounting means, and centrifugally responsive means having the form of weighted floating levers fulcrumed on the pressure plate and spring mounting means respectively and adapted to separate the pressure plate and the spring mounting means whereby to cause clutching engagement between the pressure plate and the driven member when the manually operable means is in a predetermined intermediate position.

5. An automatic clutch including driving and driven members, means for engaging said members comprising a pressure plate associated with the driving member and movable to clutch the driven member against the driving member, a spring backed member yieldably engaging said pressure plate and having a flange at its periphery, manually operable means for shifting said last mentioned member to manually advance or retract the pressure plate, and speed responsive means including floating weighted members adapted upon movement to advance the pressure plate relative to this spring backed member whereby to cause automatic engagement of the clutch when the manually operable means is in a predetermined intermediate position, said weighted members being limited in movement in one direction by engagement with said flange.

6. An automatic clutch including driving and driven members, means for engaging said members comprising a pressure plate associated with the driving member and movable to clutch the driven member against the driving member, a spring backed member yieldably engaging said pressure plate and having a flange at its periphery, means adapted to yieldingly hold said pressure plate against the spring backed member, manually operable means for shifting said last mentioned member to manually advance or retract the pressure plate, and speed responsive means including floating weighted members adapted upon movement to advance the pressure plate relative to the spring backed member whereby to cause automatic engagement of the clutch when the manually operable means is in a predetermined intermediate position, said weighted members being limited in movement in one direction by engagement with said flange.

7. An automatic clutch comprising a driving member, a driven member, a pressure plate revolving with the driving member on the opposite side of the driven member and axially movable to engage the driven member against the driving member, a housing for the pressure plate, a spring mounting ring interposed between the pressure plate and the housing, pressure springs precompressed between the housing and the spring mounting ring, spring means acting to retract the pressure plate against said spring mounting ring, manually movable means for holding the spring mounting ring in an intermediate position against the pressure of said precompressed pressure springs whereby the clutch is disengaged below a predetermined speed and a plurality of centrifugally energized levers fulcrumed on the pressure plate and engaging the spring mounting ring to both advance the pressure plate to engage the driven member and to transfer the precompressed spring load from the manually movable means to the pressure plate to provide full clutch engagement limited only by the predetermined pressure spring load.

8. An automatic clutch comprising a driving member, a driven member, a pressure plate revolving with the driving member on the opposite side of the driven member and axially movable to engage the driven member against the driving member, a housing for the pressure plate, a spring mounting ring interposed between the pressure plate and the housing, pressure springs precompressed between the housing and the spring mounting ring, spring means acting to retract the pressure plate against said spring mounting ring, manually movable means for holding the spring mounting ring in an intermediate position against the pressure of said precompressed pressure springs whereby the clutch is disengaged below a predetermined speed and a plurality of centrifugally energized levers engaging between the spring mounting ring and the pressure plate to both advance the pressure plate to engage the driven member and to transfer the precompressed spring load from the manually movable means to the pressure plate to provide full clutch engagement limited only by the predetermined pressure spring load.

9. In combination, a driving member; a driven member; speed-responsive means for causing said driving member to engage said driven member when said driving member reaches a predetermined speed; a reaction member against which said speed-responsive means reacts; spring means, comprising a plurality of compression springs circularly disposed about the periphery of, and acting directly against said reaction member, for resisting movement of said reaction member in response to the operation of said speed-responsive means; and means for withdrawing said driving member and said reaction member from said driven member for de-clutching purposes, portions of said speed-responsive means being disposed between, and lying in surface engagement with flat surfaces provided on said driving member and said reaction member.

HAROLD NUTT.